April 20, 1937.　　　　G. P. ROBERTS　　　　2,077,955
BRAKE
Filed July 12, 1935

INVENTOR.
GLYN PIERCE ROBERTS
BY
ATTORNEY

Patented Apr. 20, 1937

2,077,955

UNITED STATES PATENT OFFICE 2,077,955

BRAKE

Glyn Pierce Roberts, Birmingham, England, assignor to Bendix Products Corporation, South Bend, Ind., a corporation of Indiana Application July 12, 1935, Serial No. 30,972
In Great Britain January 3, 1935

18 Claims. (Cl. 188—78)

This invention relates to brakes, and is illustrated as embodied in an internal expanding brake for an automobile. An object of the invention is to provide simple means for modifying the servo action of a primary shoe on a secondary shoe, by frictionally absorbing a part of the thrust of the primary shoe, so that only the unabsorbed part of the thrust acts on the secondary shoe.

In one desirable arrangement the friction means for partially absorbing the thrust is associated with a device which connects the shoes, and I prefer to utilize an expansible connecting device which serves to adjust the brake for wear. The connecting device illustrated includes connected sockets threadedly receiving a pair of shoe-engaging thrust members or plungers.

An important feature of the invention relates to constructing the friction thrust-absorbing means so that it will operate in both forward and reverse braking, especially when it is used in a brake in which one shoe anchors when the drum is turning in one direction (forward braking) and the other shoe anchors when the drum is turning in the other direction (reverse braking).

In the illustrated embodiment, the above-described sockets or their equivalents are provided with wedge surfaces for forcing friction blocks apart against an outer stationary cylinder. Shifting of the blocks lengthwise in frictional engagement with the cylinder is preferably resisted by tensioned springs, shown as connected between plates engaging the ends of the cylinder. These springs, it will be noted, when so arranged also serve to return the friction blocks to their initial positions when the brake is released.

Figure 1:
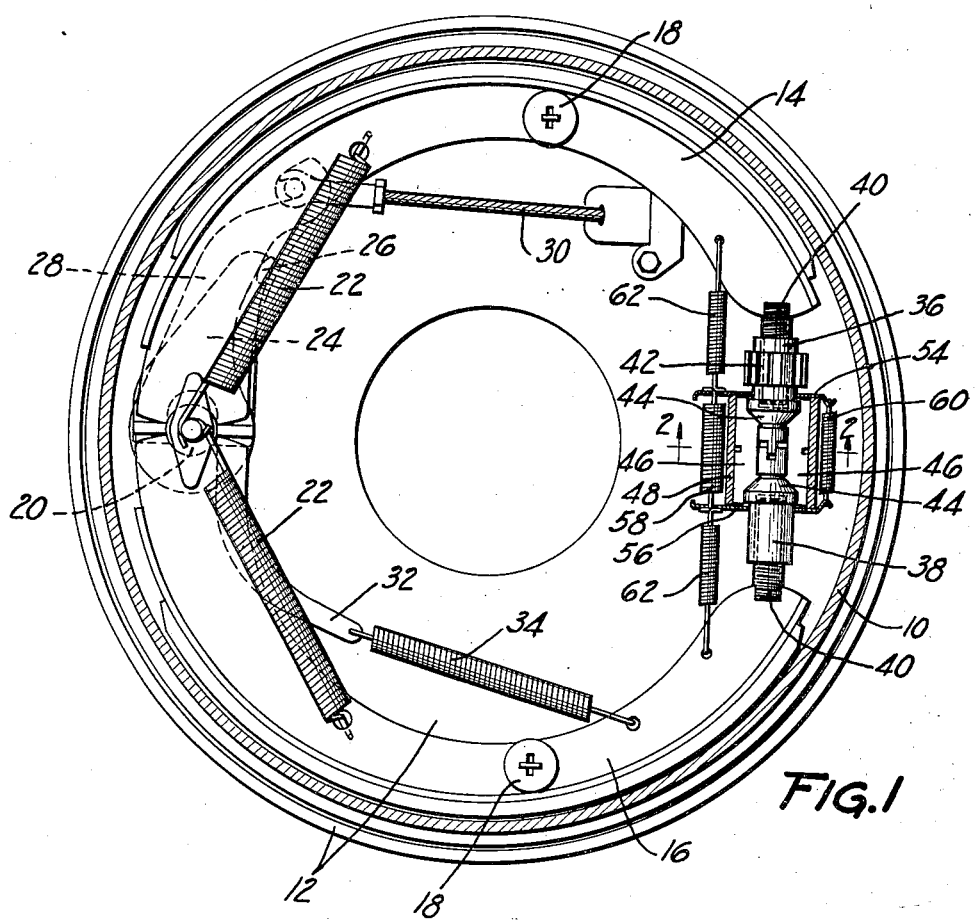
Figure 2:
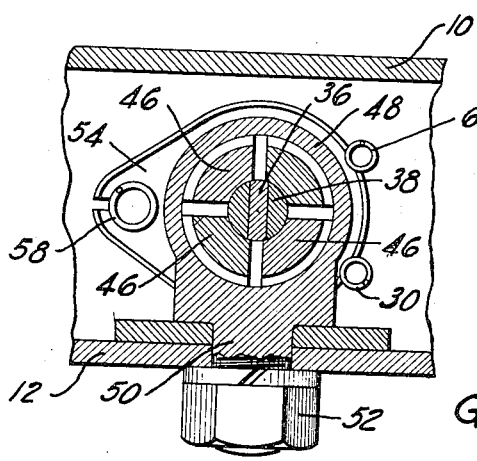

The above and other objects and features of the invention, including various novel combinations of parts and desirable particular constructions, will be apparent from the following description of the illustrative embodiment shown in the accompanying drawing, in which:

Figure 1 is a vertical section through a brake, just inside the head of the brake drum, and showing the shoes in side elevation; and Figure 2 is a partial section, on the line 2—2 of Figure 1, through the novel shoe-connecting means.

The brake selected for illustration comprises a rotatable drum 10, at the open side of which is a support such as a backing plate 12, cooperating with the drum to define a substantially closed chamber housing the brake friction means. The friction means is shown as a pair of shoes 14 and 16, having suitable steady rests 18.

The anchorage means for the shoes is shown as a fixed post 20 carried by the backing plate 12 and arranged between the ends of the shoes. Return springs 22 are tensioned between the end of anchor 20 and the two shoes, the spring connected to the shoe which anchors in forward braking being the stronger.

The applying means is illustrated as a floating lever 24 having thrust lugs engaging the shoe ends, and having on one side at its end a lug 26 engaged by a lever 28 pivoted on the anchor 20. The lever 28 may be operated by means such as a cable 30 which passes through the backing plate and which may be associated, outside the brake, with a flexible conduit to form a Bowden-type control. One of the levers is provided with a lower extension 32 to which a return spring 34 is connected.

The novel shoe connecting means, in the embodiment illustrated, includes a pair of sockets 36 and 38, one of which has at its end a tongue keyed in a notch in the end of the other, so that the two will turn together. In these sockets are threaded thrust members 40 which are notched at their ends to embrace the ends of the shoe webs. One of the sockets has a pinion or the like 42, adapted to be engaged and turned by a suitable tool inserted through an opening in the backing plate, to force members 40 apart to take up for wear.

The sockets 36 and 38, or the equivalent shoe-connecting means, are preferably formed with wedge surfaces 44 engaging corresponding surfaces on a set of friction blocks 46 arranged between the aligned sockets and an outer encircling cylinder 48 fixed on the backing plate, for example by a threaded stem 50 passing through the backing plate and having a nut 52 threaded thereon. In referring to part 48 as a "cylinder" it is not my intention to imply that it is necessarily round in cross-section, although ordinarily that is the shape which can be made the most cheaply.

Plates 54 and 56 are shown arranged at the ends of the cylinder, connected by springs 58 and 60. These springs should be fairly strong; for example spring 58 might be twenty-five pounds and springs 60 each twelve and one-half pounds. Lighter springs (e. g. five pounds) 62 forming integral extensions of the springs 58 are secured to the shoes 14 and 16 respectively, to hold the shoes against their thrust plungers 40.

It will be seen that when the brake is applied, no matter which direction the drum is turning, the blocks 46 will be wedged apart, and dragged frictionally lengthwise of the cylinder 48 against the resistance of the springs 58 and 60. This divides the thrust of the unanchored or primary shoe between the backing plate and the anchored secondary shoe. When the brake is released, the springs 58 and 60 return the blocks 46 to their initial positions.

While one illustrative embodiment has been described in detail, it is not my intention to limit the scope of my invention to that particular embodiment, or otherwise than by the terms of the appended claims.

I claim:

1. A brake comprising a drum, a pair of shoes, anchorage means on which one shoe anchors when the drum is turning in one direction and on which the other shoe anchors when the drum is turning in the other direction, an expansible adjustment connecting the shoes, and friction means associated with the adjustment for absorbing a portion of the thrust of the unanchored shoe and transmitting the same to the backing plate when the brake is applied.

2. A brake comprising a drum, a pair of shoes, anchorage means on which one shoe anchors when the drum is turning in one direction and on which the other shoe anchors when the drum is turning in the other direction, and friction means for absorbing about half of the thrust of the unanchored shoe and transmitting the remainder of the thrust to the anchored shoe.

3. A brake comprising a pair of shoes and a backing plate having anchorage means therefor, and means connecting said shoes and transmitting a considerable part of the thrust of one shoe frictionally to the backing plate and transmitting the remaining part to the other shoe.

4. A brake comprising a pair of shoes and a backing plate having anchorage means therefor, means connecting said shoes and transmitting part of the thrust of one shoe frictionally to the backing plate and transmitting the remaining part to the other shoe, and means acting on the connecting means to release the friction means and center the shoes when the brake is released.

5. A brake comprising a drum and friction means associated therewith, in combination with a friction device arranged to absorb a considerable part of the torque of the friction means in both directions of drum rotation and transmit the same to the backing plate, and a fixed anchorage taking the remainder of said torque in both directions of drum rotation.

6. A brake comprising a drum and friction means associated therewith, in combination with a friction device arranged to absorb a considerable part of the torque of the friction means and transmit the same to the backing plate, and a fixed anchorage taking the remainder of said torque.

7. A connecting device for brake shoes comprising an expansible shoe-adjustment connection having wedge surfaces, friction blocks engaged by said surfaces and wedged apart by movement of said connection, and a stationary part having friction surfaces against which said blocks are wedged.

8. A connecting device for brake shoes comprising an expansible shoe-adjustment connection having wedge surfaces, friction blocks engaged by said surfaces and wedged apart by movement of said connection, a stationary part having friction surfaces against which said blocks are wedged, and springs tensioned by frictional movement of said blocks on said part and which shift the blocks back to their initial positions when the brake is released.

9. A connecting device for brake shoes comprising a shoe connection having wedge surfaces, friction blocks engaged by said surfaces and wedged apart by movement of said connection, and a stationary part having friction surfaces against which said blocks are wedged.

10. A connecting device for brake shoes comprising a shoe connection having wedge surfaces, friction blocks engaged by said surfaces and wedged apart by movement of said connection, a stationary part having friction surfaces against which said blocks are wedged, and springs tensioned by frictional movement of said blocks on said part and which shift the blocks back to their initial positions when the brake is released.

11. A shoe connecting device comprising a pair of sockets arranged end to end and connected to turn together and which have wedge surfaces, shoe-engaging thrust members threaded in said sockets, an open-ended cylinder encircling said sockets, and friction blocks arranged between said cylinder and said sockets and engaged by said wedge surfaces and wedged outwardly against the cylinder by movement of said sockets.

12. A shoe connecting device comprising lengthwise movable shoe-connecting means having wedge surfaces, an open-ended cylinder encircling said means, and friction blocks arranged between said cylinder and said means and engaged by said wedge surfaces and wedged outwardly against the cylinder by movement of said means.

13. A shoe connecting device comprising a pair of sockets arranged end to end and connected to turn together and which have wedge surfaces, shoe-engaging thrust members threaded in said sockets, an open-ended cylinder encircling said sockets, friction blocks arranged between said cylinder and said sockets and engaged by said wedge surfaces and wedged outwardly against the cylinder by movement of said sockets, and springs associated with said blocks and tensioned by movement of the blocks lengthwise of the cylinder.

14. A shoe connecting device comprising lengthwise movable shoe-connecting means having wedge surfaces, an open-ended cylinder encircling said means, friction blocks arranged between said cylinder and said means and engaged by said wedge surfaces and wedged outwardly against the cylinder by movement of said means, and springs associated with said blocks and tensioned by movement of the blocks lengthwise of the cylinder.

15. A shoe connecting device comprising a pair of sockets arranged end to end and connected to turn together and which have wedge surfaces, shoe-engaging thrust members threaded in said sockets, an open-ended cylinder encircling said sockets, and friction blocks arranged between said cylinder and said sockets and engaged by said wedge surfaces and wedged outwardly against the cylinder by movement of said sockets, in combination with plates arranged over the ends of the cylinder in engagement with the ends of the blocks, and springs tensioned between the plates.

16. A shoe connecting device comprising lengthwise movable shoe-connecting means having wedge surfaces, an open-ended cylinder encircling said means, and friction blocks arranged between said cylinder and said means and engaged by said wedge surfaces and wedged outwardly against the cylinder by movement of said means, in combination with plates arranged over the ends of the cylinder in engagement with the ends of the blocks, and springs tensioned between the plates.

17. A shoe connecting device comprising a pair of sockets arranged end to end and connected to turn together and which have wedge surfaces, shoe-engaging thrust members threaded in said sockets, an open-ended cylinder encircling said sockets, and friction blocks arranged between said cylinder and said sockets and engaged by said wedge surfaces and wedged outwardly against the cylinder by movement of said sockets, in combination with means for mounting the cylinder rigidly on a brake backing plate.

18. A shoe connecting device comprising lengthwise movable shoe-connecting means having wedge surfaces, an open-ended cylinder encircling said means, and friction blocks arranged between said cylinder and said means and engaged by said wedge surfaces and wedged outwardly against the cylinder by movement of said means, in combination with means for mounting the cylinder rigidly on a brake backing plate.

GLYN PIERCE ROBERTS.